3,198,621
DESTROYING VEGETATION WITH 4-NITROSO 1-PIPERAZINETHIOCARBOXYLATES
John J. D'Amico, Charleston, W. Va., assignor to Monsanto Company, a corporation of Delaware
No Drawing. Original application May 25, 1961, Ser. No. 112,510. Divided and this application June 1, 1964, Ser. No. 382,979
6 Claims. (Cl. 71—2.5)

This is a division of application Serial No. 112,510, filed May 25, 1961.

This invention relates to a new class of piperazines, to the process of making the same, and to the process of destroying or controlling undesired vegetation.

The new compounds possess the structure

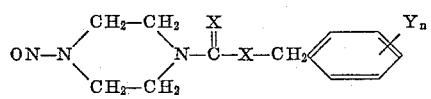

where X is oxygen or sulfur at least one of which is sulfur, Y is halogen and $n$ is an integer greater than zero but less than five, preferably two or three.

The halogen substituents are preferably chlorine but bromine and to a lesser extent fluorine and iodine are also suitable. Not more than four halogen atoms should be present. Whether the number of halogens is two, three or four, it is preferred that the 2- and 6-positions are occupied by halogen.

The halobenzyl esters of 4-nitroso 1-piperazinecarbothionic acid may be prepared by condensing a halobenzyl xanthate with sodium monochloroacetate and the product treated with 4-nitrosopiperazine. The halobenzyl esters of 4-nitroso 1-piperazinecarbodithioic and 4-nitroso 1-piperazinecarbothiolic acids may be prepared by condensing a halogenated benzyl halide with the carbodithioic or carbothiolic acid. However, the free acids are of limited stability and are preferably used in the form of their salts. The condensations go readily in aqueous medium with water soluble salts, as for example alkali metal or ammonium salts. Substituted ammonium salts, also known as amine addition salts, can be used as for example, triethylamine, trimethylamine, tributylamine and other tertiary organic amine salts. The acids and salts thereof which correspond to the esters also appear to be new compounds. The carbodithioic and carbothiolic acids form readily from 4-nitrosopiperazine and carbon disulfide or carbonoxysulfide. As explained, it is preferred to carry out the condensation in the presence of either a tertiary organic amine or inorganic base. For example, sodium 4-nitroso 1-piperazinecarbodithioate formed in 100% yield by reacting 0.2 mole each of 4-nitrosopiperazine, carbon disulfide and 25% sodium hydroxide in 200 ml. of water at 5–15° C. The product was a 15.2% solution of the sodium salt. These methods of synthesis are illustrative only and other methods can be used where desired.

As illustrative of the new compounds there may be mentioned 2,3,5,6-tetrachlorobenzyl 4-nitroso-1-piperazinecarbodithioate, 2,3,5,6-tetrachlorobenzyl 4-nitroso-1-piperazinecarbothiolate, 2,3,5,6-tetrachlorobenzyl 4-nitroso - 1-piperazinecarbothionate, 2,3,4,5-tetrachlorobenzyl 4-nitroso-1-piperazinecarbodithioate, 2,3,4,5,-tetrachlorobenzyl 4-nitroso-1-piperazinecarbothiolate, 2,3,4,5-tetrachlorobenzyl 4-nitroso-1-piperazinecarbothionate, 2,3,4-trichlorobenzyl 4 - nitroso - 1 - piperazinecarbodithioate, 2,3,4,-trichlorobenzyl 4 - nitroso-1-piperazinecarbothiolate, 2,3,4-trichlorobenzyl 4-nitroso-1-piperazinecarbothionate, 2,3,5,-trichlorobenzyl 4-nitroso-1-piperazinecarbodithioate, 2,3,5-trichlorobenzyl 4-nitroso-1-piperazinecarbothiolate, 2,3,5 - trichlorobenzyl 4-nitroso-1-piperazinecarbothionate, 2,3,6-trichlorobenzyl 4-nitroso-1-piperazinecarbodithioate, 2,3,6-trichlorobenzyl 4-nitroso-1-piperazinecarbothiolate, 2,3,6-trichlorobenzyl 4-nitroso-1-piperazinecarbothionate, 2,4,5-trichlorobenzyl 4-nitroso-1-piperazinecarbodithioate, 2,4,5-trichlorobenzyl 4-nitroso-1-piperazinecarbothiolate, 2,4,5-trichlorobenzyl 4-nitroso-1-piperazinecarbothionate, 2,6-dichlorobenzyl 4-nitroso-1-piperazinecarbodithioate, 2,6-dichlorobenzyl 4-nitroso-1-piperazinecarbothiolate, 2,6-dichlorobenzyl 4-nitroso-1-piperazinecarbothionate, 2,6-dibromobenzyl 4-nitroso-1-piperazinecarbodithioate, 2,6-dibromobenzyl 4-nitroso-1-piperazinecarbothiolate and 2,6-dibromobenzyl 4-nitroso-1-piperazinecarbothionate.

The detailed examples below illustrate the preparation and properties of the new compounds but are not to be taken as limitative.

EXAMPLE 1

To a stirred charge containing 11.6 grams (0.1 mole) of 4-nitrosopiperazine, 16 grams (0.1 mole) of 25% sodium hydroxide and 200 ml. of water was added dropwise at 5–15° C. 7.6 grams (0.1 mole) of carbon disulfide and stirring continued for an additional hour. To the sodium 4-nitroso-1-piperazinecarbodithioate so prepared was added 19.6 grams (0.1 mole) of 2,6-dichlorobenzyl chloride in one portion and the reaction mixture stirred at 25–30° C. for 24 hours. After cooling to 5° C., the precipitate was collected by filtration, washed with water until neutral to litmus and air dried at 25–30° C. After recrystallization from benzene the 2,6-dichlorobenzyl 4-nitroso-1-piperazinecarbodithioate, obtained in 65.5% yield as a white solid, melted at 174–175° C. Analysis gave 17.9% sulfur compared to 18.3% calculated for $C_{12}H_{13}Cl_2N_3OS_2$.

EXAMPLE 2

In the procedure of Example 1, 23 grams (0.1 mole) of 2,3,6-trichlorobenzyl chloride was substituted for the 2,6-dichlorobenzyl chloride. The product was cooled to 0° C. and isolated as described. The 2,3,6-trichlorobenzyl 4-nitroso-1-piperazinecarbodithioate was a tan solid melting at 203–204° C. after recrystallization from dilute acetone solution. The yield was 74.5% of theory. Analysis gave 16.5% sulfur compared to 16.7% calculated for $C_{12}H_{12}Cl_3N_3OS_2$.

EXAMPLE 3

To a stirred charge containing 13.8 grams (0.12 mole) of 4-nitrosopiperazine, 16 grams (0.1 mole) of 25% sodium hydroxide and 50 ml. of water was added in 12 minutes at 0–5° C. 7.6 grams (0.107 mole) of 85% COS. Next there was added in one portion 23 grams (0.1 mole) of 2,3,6-trichlorobenzyl chloride and stirring continued for an hour at 0–10° C., a second hour at 10–15° C., a third hour at 15–20° C. and for 24 hours at 25–30° C. To the reaction mixture was then added 250 ml. of water and the solution stirred at 25–30° C. for an additional 15 minutes. The precipitate was collected by filtration, washed with water until neutral to litmus and air dried at 25–30° C. 2,3,6-trichlorobenzyl 4-nitroso-1-piperazinecarbothiolate was obtained as a white solid in 57.1% yield. After recrystallization from ethyl acetate the product melted at 173–175° C. Analysis gave 28.7% chlorine compared to 28.8% calculated for $C_{12}H_{12}Cl_3N_3O_2S$.

EXAMPLE 4

Substituting 19.5 grams (0.1 mole) of 2,6-dichlorobenzyl chloride for the 2,3,6-trichlorobenzyl chloride in Example 3, 2,6-dichlorobenzyl 4-nitroso-1-piperazinecarbothiolate was obtained as a white solid in 68.5% theory yield. After recrystallization from ethyl acetate the product melted at 120–122° C. Analysis gave 21.2% chlorine, the calculated value for $C_{12}H_{13}Cl_2N_3O_2S$.

EXAMPLE 5

The trichlorobenzyl chloride used in the preparation of this example may be prepared by the following procedure: Substantially 1500 parts by weight of dry toluene was charged into a chlorinator of suitable capacity. Substantially 15 parts by weight of iron filings were added as catalyst carrier for ring chlorination and chlorine introduced at about 20° C. During the last part of the run the temperture was increased to about 70° C. in order to keep the mixture fluid and the flow of chlorine continued until the increase in weight corresponded to that calculated for trichlorotoluene. Thus, when the product analyzed 54.8% chlorine, the flow of chlorine was interrupted and the trichlorotoluene given a 10% caustic wash and filtered through a bed of clay in order to remove the iron. Alternatively, the iron may be removed by distillation of the chlorinated product. The product was then chlorinated at 160° C. in the presence of ultra violet light until the gain in weight was that calculated for trichlorobenzyl chloride. Analysis of the product for chlorine at this point gave 61.8%.

Condensation with 4-nitrosopiperazine was effected as follows: A solution comprising 11.6 grams (0.1 mole) of 4-nitrosopiperazine, 16 grams (0.1 mole) of 25% sodium hydroxide and 200 ml. of water was prepared and 7.6 grams (0.1 mole) of carbon disulfide added dropwise at 5–15° C. The reaction mixture was then stirred at 25–30° C. for one hour and 20.7 grams (0.09 mole) of ar,ar,ar-trichlorobenzyl chloride added in one portion. The product was then stirred at 25–30° C. for 24 hours, 50 ml. of ethyl ether added and the solution cooled to 5° C. The product was collected by filtration, washed with 200 ml. of water and air dried at 25–30° C. ar,ar,ar-Trichlorobenzyl 4-nitroso-1-piperazinecarbodithioate was obtained as a white solid melting at 155–164° C.

EXAMPLE 6

To a stirred charge containing 18.9 grams (0.2 mole) of chloroacetic acid and 100 ml. of water was added in small portions enough sodium carbonate to give a pH of 8. After stirring the charge at 15–20° C. for 15 minutes, 68 grams (0.2 mole) of potassium 2,3,6-trichlorobenzyl-xanthate monohydrate was added in one portion and stirring continued for 1 hour at 25–30° C. Then, 34.6 grams (0.3 mole) of 4-nitrosopiperazine was added in one portion and the reaction mixture stirred at 25–30° C. for 18 hours. The resulting precipitate was collected by filtration, washed with water until neutral to litmus and air dried at 25–30° C. This precipitate was slurried with 100 ml. of ethyl ether, filtered and air dried at 25–30° C. 2,3,6-trichlorobenzyl 4-nitroso-1-piperazinecarbothionate was obtained in 68.6% yield as a white solid melting at 169–171° C. after recrystallization from acetone. Analysis gave 9.1% sulfur and 28.7% chlorine compared to 8.7% sulfur and 28.8% chlorine calculated for $$C_{12}H_{12}Cl_3N_3O_2S$$

The intermediate potassium 2,3,6-trichlorobenzylxanthate monohydrate was prepared by the following procedure: A charge comprising 43 grams (0.2 mole) of 2,3,6-trichlorobenzyl alcohol and 500 ml. of heptane was heated with stirring to 70° C. The solution was then cooled to 30° C. and 12.6 grams (0.2 mole) of 90% potassium hydroxide added in one portion. After stirring at 25–30° C. for 6 hours, 22.8 grams (0.3 mole) of carbon disulfide was added and stirring continued at 25–30° C. for an additional 18 hours. The precipitate was collected by filtration, washed with 200 ml. of ethyl ether and dried at 25–30° C. The xanthate was obtained in 100% yield as a light yellow solid.

Herbicidal compositions may be prepared by admixing the piperazine with a carrier material in order to provide formulations adapted for ready and efficient application in liquid or solid form. Solid compositions are formulated by mixing the toxicant with a finely divided or granular solid, as, for example, tricalcium phosphate, calcium carbonate, kaolin, bole, kisselguhr, talc, bentonite, fuller's earth, pyrophyllite, diatomaceous earth, calcinated magnesia, volcanic ash, sulfur and the like inorganic solid materials, and include for example, such materials of organic nature as powdered cork, powdered wood, and powdered walnut shells. The preferred solid carriers are the adsorbent clays, e.g., bentonite These mixtures can be used for herbicidal purposes in the dry form, or, by addition of water-soluble surfactants the dry particular solids can be rendered wettable by water so as to obtain stable aqueous dispersions or suspensions suitable for use as sprays. The carrier will be in major proportion and the toxicant, while less than 50% of the composition, will be present in herbicidally effective proportion.

Useful properties as herbicides are illustrated by applying the piperazines as aqueous sprays to germinating seedlings. The active ingredient was emulsified in water and applied to seeded soil at the rate of 5 pounds per acre. About fourteen days after application of the toxicants results were observed and recorded. The number of seeds emerging was converted to weighted herbicidal ratings based on average percent germination of any particular seed lot times an injury factor. This evened irregularities of herbicide ratings of seeds which varied in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale:

| Percent emergence | Phytotoxicity rating |
|---|---|
| 0–25 | 3 or severe. |
| 26–50 | 2 or moderate. |
| 51–75 | 1 or slight. |
| 76–100 | 0 or none. |

The phytotoxicities are recorded below:

Table I

| Toxicant | Results Observed |
|---|---|
| 2,6-Dichlorobenzyl 4-nitroso-1-piperazine-carbodithioate. | Moderate phytotoxicity to morning glory, pigweed and soybean. |
| 2,3,6-Trichlorobenzyl 4-nitroso-1-piperazine-carbodithioate. | Severe phytotoxicity to morning glory, sugar beet, crab grass, pigweed, soybean, wild buckwheat and tomato; moderate phytotoxicity to mustard (radish) and foxtail. |
| 2,3,6-Trichlorobenzyl 4-nitroso-1-piperazine-carbothiolate. | Severe phytotoxicity to morning glory, sugar beet, pigweed, soybean and tomato. |
| 2,6-Dichlorobenzyl 4-nitroso-1-piperazine-carbothiolate. | Severe phytotoxicity to pigweed. |
| ar,ar,ar-Trichlorobenzyl 4-nitroso-1-piperazine-carbodithioate. | Moderate phytotoxicity to morning glory, pigweed and soybean. |

Formative effects were exerted in most cases.

Greater efficiency than from surface application results from incorporating the toxicants into the top layer of soil. Phytotoxicity ratings observed by incorporating the piperazines into the surface soil at a concentration of ¼ pound per acre are recorded below:

Table II

| Toxicant | Results Observed |
|---|---|
| 2,3,6-Trichlorobenzyl 4-nitroso-1-piperazine-carbodithioate. | Severe phytotoxicity to morning glory, sugar beet, pigweed and soybean; moderate phytotoxicity to wild buckwheat and tomatt. |
| 2,3,6-Trichlorobenzyl 4-nitroso-1-piperazine-carbothiolate. | Severe phytotoxicity to soybean; moderate phytotoxicity to morning glory, mustard (radish), sugar beet and pigweed. |

At 0.15 pound per acre 2,3,6-trichlorobenzyl 4-nitroso-1-piperazinecarbodithioate was still severely toxic to pigweed and soybean and moderately toxic to morning glory.

The term "surfactant" as employed in the specification and in the appended claims is used as in volume II of Schwartz, Perry and Berch's "Surface Active Agents and Detergents" (1958, Interscience Publishers, Inc., New York), in place of the expression "emulsifying agent" to connote generically the various "emulsifying agents," "dispersing agents," "wetting agents" and "spreading agents" that are adapted to be admixed with the active compounds of this invention in order to secure better wetting and spreading of the compound in water vehicle or carrier in which it is insoluble through lowering the surface tension of the water (see also Frear, "Chemistry of Insecticides, Fungicides and Herbicides," second edition, page 280). These surfactants include the well-known capillary-active substances which may be anion-active (or anionic), cation active (or cationic), or non-ionizing (or non-ionic), which are described in detail in volumes I and II of Schwartz, Perry and Berch's "Surface Active Agents and Detergents" (1958, Interscience Publishers, Inc., New York), and also in the November 1947 issue of Chemical Industries (pages 811–824) in an article entitled, "Synthetic Detergents," by John W. McCutcheon and also in the July, August, September and October 1952 issues of Soap and Sanitary Chemicals under the title, "Synthetic Detergents." The preferred surfactants are the water-soluble anionic surface-active agents and the water-soluble non-ionic surface-active agents and set forth in U.S. 2,846,398 (issued August 5, 1958). In general it is preferred that a mixture of water-soluble anionic and water-soluble non-ionic surfactants be employed. Generally, the surfactant will comprise only a small proportion of the composition, say 0.1–15% by weight of the toxicant. Solution of the toxicant in organic solvents containing small amounts of surfactant provides versatile herbicidal compositions useful for direct application to soil or for preparing aqueous sprays. Emulsifiable concentrates may be prepared by dissolving the toxicant in heavy aromatic naphtha and incorporating about 5% of the total composition of surfactant. The particular dosage to be applied in a given situation can be readily determined by those skilled in the art by conventional techniques. It depends upon the formulation, type of vegetation to be controlled, climatic conditions and the particular toxicant used. Compositions containing the active ingredient in a concentration within the range of 0.1–15.0% by weight applied to constitute total dosage of active ingredient within the range of 0.1–100 pounds per acre comprise the ranges usually employed.

Also, 4-nitroso-1-piperazinethiocarboxylates are useful intermediates. Under basic conditions, as for example by treatment with urea, the nitroso group can be removed. Reduction of the nitroso group in known manner leads to hydrazine type compounds.

It is intended to cover all changes and modifications of the examples of the invention herein chosen for purposes of disclosure which do not constitute departures from the spirit and scope of the invention.

What is claimed is:

1. The method of destroying undesired vegetation which comprises applying thereto a phytotoxic concentration of a compound of the structure

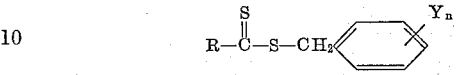

where R represents the 4-nitroso-1-piperazine group, Y is halogen and $n$ is an integer at least two but less than five.

2. The method of destroying undesired vegetation which comprises applying thereto a phytotoxic concentration of a compound of the structure

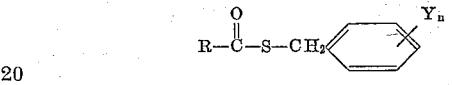

where R represents the 4-nitroso-1-piperazine group, Y is halogen and $n$ is an integer at least two but less than five.

3. The method of claim 1 in which the piperazine is applied to the ground before the plants emerge.

4. The method of destroying undesired vegetation which comprises applying thereto a phytotoxic concentration of 2,3,6-trichlorobenzyl 4-nitroso-1-piperazinecarbodithioate.

5. The method of destroying undesired vegetation which comprises applying thereto a phytotoxic concentration of 2,3,6-trichlorobenzyl 4-nitroso-1-piperazinecarbothiolate.

6. The method of destroying undesired vegetation which comprises applying thereto a phytotoxic concentration of 2,3,6-trichlorobenzyl 4-nitroso-1-piperazinecarbothionate.

References Cited by the Examiner

UNITED STATES PATENTS

| | | | |
|---|---|---|---|
| 2,690,440 | 9/54 | Himel et al. | 260—268 X |
| 2,744,898 | 5/56 | Harman et al. | 260—268 X |
| 2,792,394 | 5/57 | Himel et al. | 260—268 X |
| 2,907,767 | 10/59 | Berg | 260—268 |

OTHER REFERENCES

Kushner et al., Journal Organic Chemistry, vol. 13, pp. 144–153 (1948).

JULIAN S. LEVITT, *Primary Examiner.*